United States Patent [19]
Lauth

[11] 3,938,239
[45] Feb. 17, 1976

[54] METHOD OF FORMING A SELF-FLANGING NUT JOINT

[75] Inventor: Corliss Lauth, Windsor, Canada

[73] Assignee: Lauth Fasteners Limited, Windsor, Canada

[22] Filed: Mar. 13, 1974

[21] Appl. No.: 450,730

Related U.S. Application Data

[63] Continuation-in-part of Ser. No. 360,147, May 14, 1973, abandoned.

[52] U.S. Cl. ................. 29/512; 29/243.52; 29/523; 151/41.72
[51] Int. Cl.² .................... B21D 39/00; B23P 11/00
[58] Field of Search ....... 29/432, 432.1, 432.2, 512, 29/523, 243.52; 151/41.72

[56] References Cited
UNITED STATES PATENTS

| | | | |
|---|---|---|---|
| 2,026,757 | 1/1936 | Swanstrom | 151/41.72 |
| 2,325,929 | 8/1943 | Amesbury et al. | 29/243.52 X |
| 3,381,362 | 5/1968 | Church et al. | 29/432.2 |
| 3,800,401 | 4/1974 | Jesenick | 29/512 X |

Primary Examiner—Charlie T. Moon
Attorney, Agent, or Firm—Barnes, Kisselle, Raisch & Choate

[57] ABSTRACT

A method and apparatus for forming a self-flanging nut construction utilizing a tubular body having a laterally extending flange at one end and an opening therethrough, said opening having a first portion and a second portion of differing cross sectional areas, the first portion being formed with a thread and the second portion defining a riveting flange. A plurality of circumferentially spaced serrations are provided on the periphery of said body adjacent said flange. When the nut is placed adjacent a sheet metal body having an opening therein with the opening in alignment with the opening in the nut and the nut is forced against said plate, the metal surrounding said opening in said plate is first deformed axially of the opening to form a tubular portion and thereafter the riveting flange is deformed laterally outwardly over the end of the tubular portion formed on said plate.

8 Claims, 16 Drawing Figures

METHOD OF FORMING A SELF-FLANGING NUT JOINT

This application is a continuation-in-part of my prior application Ser. No. 360,147, filed May 14, 1973, now abandoned.

This invention relates to a self-flanging nut and joint construction and to a method and apparatus for making such a joint.

BACKGROUND OF THE INVENTION

In automotive use and the like, it is common to provide weld nuts and pierce nuts for attachment to sheet metal parts to provide a means for fastening bolts, screws and the like.

Among the objects of the invention are to provide a nut, joint and method and apparatus for making the joint, wherein high strength is obtained with minimum metal wherein excellent torque characteristics are provided, wherein the nut is readily located and properly positioned with respect to the metal part and wherein the same nut can be utilized for different gauge metal parts.

SUMMARY OF THE INVENTION

In accordance with the invention, the self-flanging nut construction utilizes a tubular body having a laterally extending flange at one end and an opening therethrough, said opening having a first portion and a second portion of differing cross sectional areas, the first portion being formed with a thread and the second portion defining a riveting flange. A plurality of circumferentially spaced serrations are provided on the periphery of said body adjacent said flange. When the nut is placed adjacent a sheet metal body having an opening therein with the opening in alignment with the opening in the nut and the nut is forced against said plate, the metal surrounding said opening in said plate is first deformed axially of the opening to form a tubular portion and thereafter the riveting flange is deformed laterally outwardly over the end of the tubular portion formed on said plate.

DESCRIPTION

Figure 6:
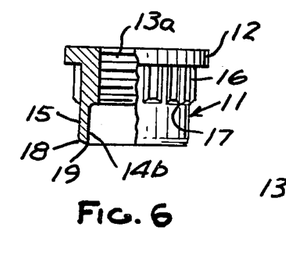
FIG. 6 is a part sectional elevational view of a nut embodying the invention.
Figure 7:
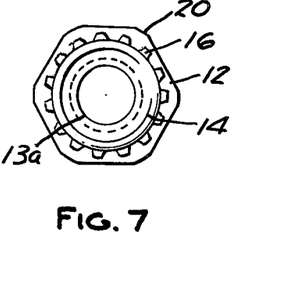
FIG. 7 is a bottom end view of the same.
Figure 8:
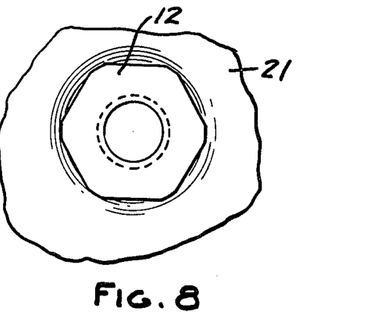
FIG. 8 is a top end view of the same in a joint construction.

Referring to FIGS. 6–8, the nut 10 embodying the invention comprises a tubular cylindrical body 11 having a hexagonal flange 12 extending radially outwardly at one end and an opening therethrough with a first threaded portion 13 and a second unthreaded portion 14 having a greater diameter than portion 13a to define a riveting flange portion 15. A plurality of circumferentially spaced serrations 16 are provided on the periphery of the cylindrical body 11 adjacent the flange 12, each serration being generally U-shaped in cross section and having a beveled lower end 17. The area of juncture of the periphery of the body 11 and the end of the flange portion 15 is rounded as at 18. The opening 14b and the free end of the flange 15 form a sharp edge as at 19. The ends or corners of the flange 12 are flattened as at 20.

As shown in FIG. 7, the minimum cross sectional dimension across the flats of the flange 12 is slightly greater than the corresponding distance across the serrations 16 and the maximum dimension across the corners of the flange 12 is just slightly greater than the corresponding diameter across the serrations 16. The nut shown in FIGS. 6–8 is intended to be used in connection with a flat sheet metal plate 21 having an opening 22 therein.

Figure 9:
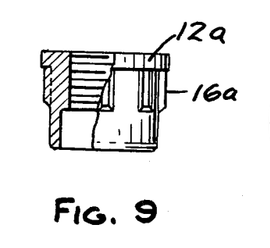
FIG. 9 is a part sectional elevational view of a modified form of nut embodying the invention.
Figures 10, 11:
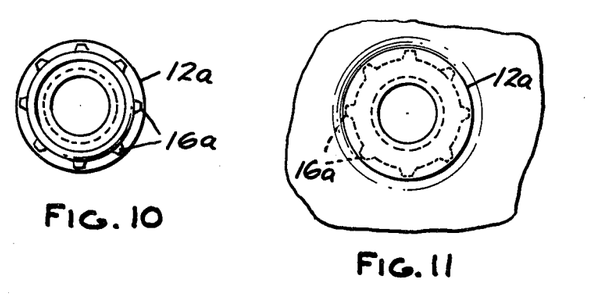
FIG. 10 is a bottom end view of the same.
FIG. 11 is a top end view of the same in a joint construction.

In the form of nut shown in FIGS. 9–11, the flange 12a is circular and the serrations 16a are dimensioned and spaced to form a polygonal configuration to facilitate grasping the nut for threading and similar operations.

Figure 1:
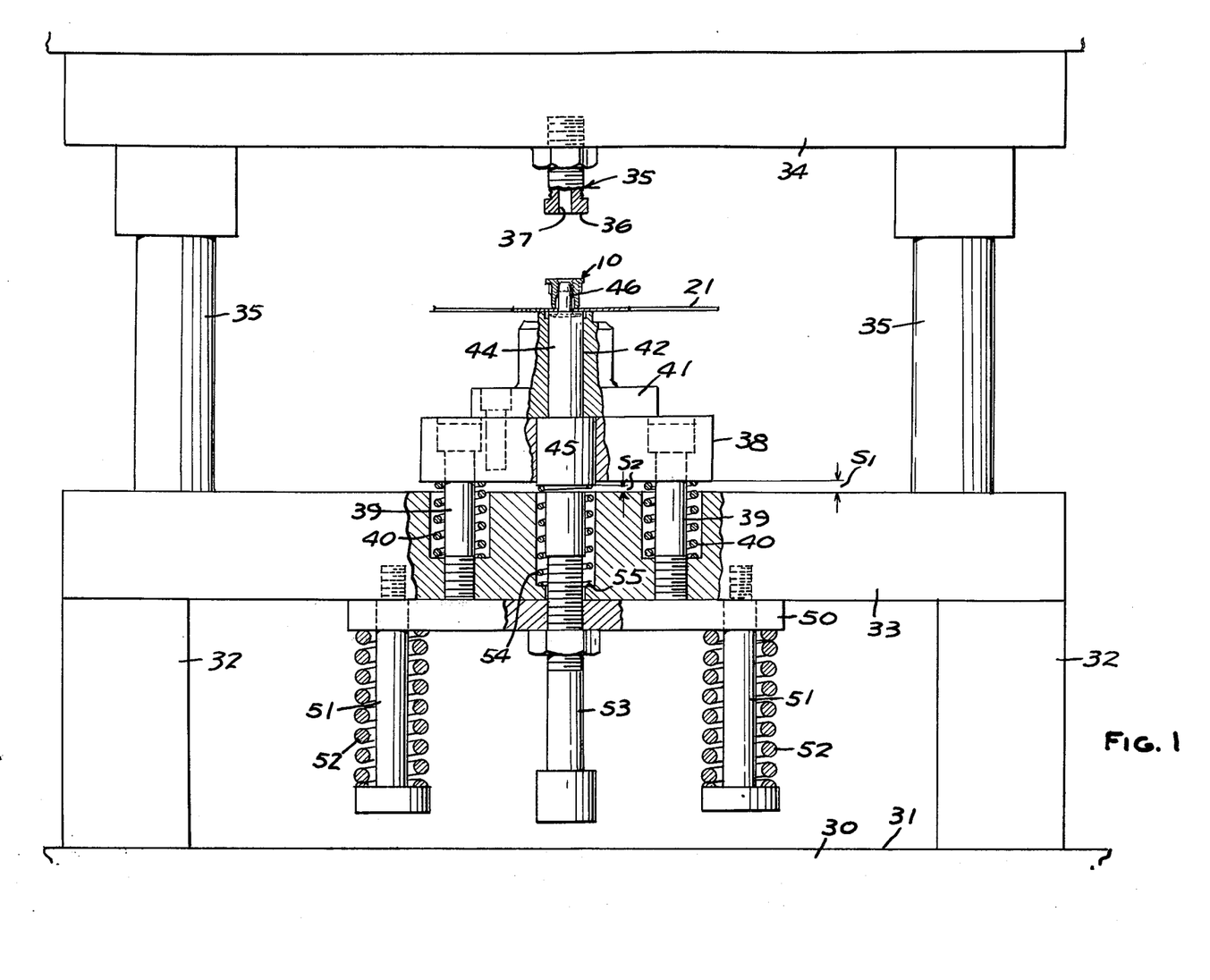
FIG. 1 is a part sectional elevational view of an apparatus embodying the invention.

Referring to FIG. 1, the apparatus for forming the joint comprises a base 30 having a flat bottom surface 31 and uprights 32 on which a first platen 33 is mounted in stationary position. A second platen 34 is mounted on rods 35 so that it is movable toward and away from the first platen 33. Second platen 34 supports a force applying tool 35 that has a flat surface 36 and an axial opening 37. A first plate 38 is supported on the first platen 33 and guided by guide pins 39. Springs 40 yieldingly urge the plate 38 upwardly away from the platen 33 to provide a space S1.

Figure 12:
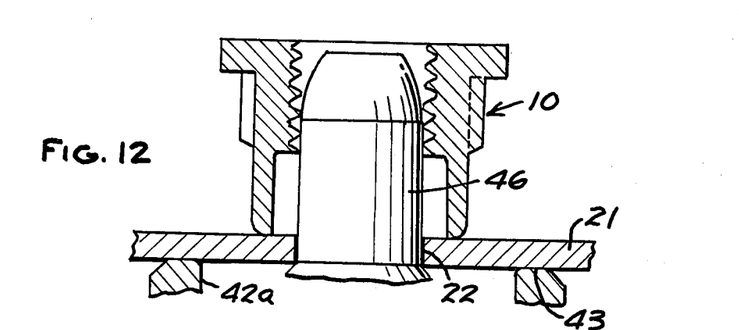
FIG. 12 is an enlarged sectional view of a portion of the apparatus shown in FIG. 1.
Figure 13:
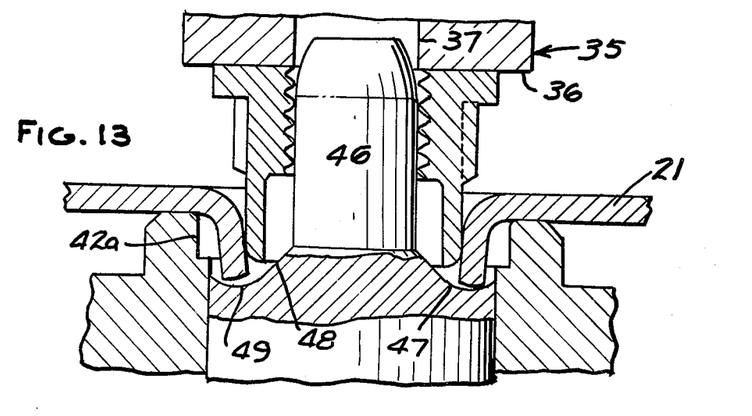
FIG. 13 is an enlarged sectional view of a portion of the apparatus shown in FIG. 2.

A first die element 41 is mounted on the first plate 38 and includes a cylindrical opening 42 which extends entirely through the die element 41 and a surface 43 at the upper end that is at a right angle to the wall of the opening 42 (FIG. 12). The upper end of opening 42 is recessed as at 42a (FIG. 13).

A second die element 44 extends upwardly through opening 42 and has the same diameter as the opening 42 in the intermediate portion thereof. At its lower end the die element 44 is enlarged as at 45 while at the upper end it is formed with a locating pin 46 of reduced diameter. An annular recess 47 is provided at the area of juncture of the lower end of the pin 46 and the intermediate portion of the die element 44 (FIG. 13). The annular recess preferably includes an inclined frustoconical portion 48 and an arcuate portion 49.

A second plate 50 is mounted on the undersurface of the platen and is guided by guide pins 51. Springs 52 interposed between the heads of the guide pins 51 and the plate 50 yieldingly urge the plate 50 toward the platen 33.

A force transmitting member or shaft 53 is provided on the second plate 50 in alignment with the second die element 44. A spring 54 is interposed between the lower end of the die element 44 and the bottom of a recess 55 in second plate 50 and yieldingly urges the second die element 44 upwardly away from the upper end of the force transmitting member 53 so that there is a space S2 therebetween.

In operation, as shown in FIGS. 1 and 12, a metal sheet or plate 21 having an opening 22 therein is placed over the pin 46 and a nut 10 is placed over the pin 45 with its lower end engaging the sheet. Platen 34 is then lowered in one continuous movement.

Figure 2:
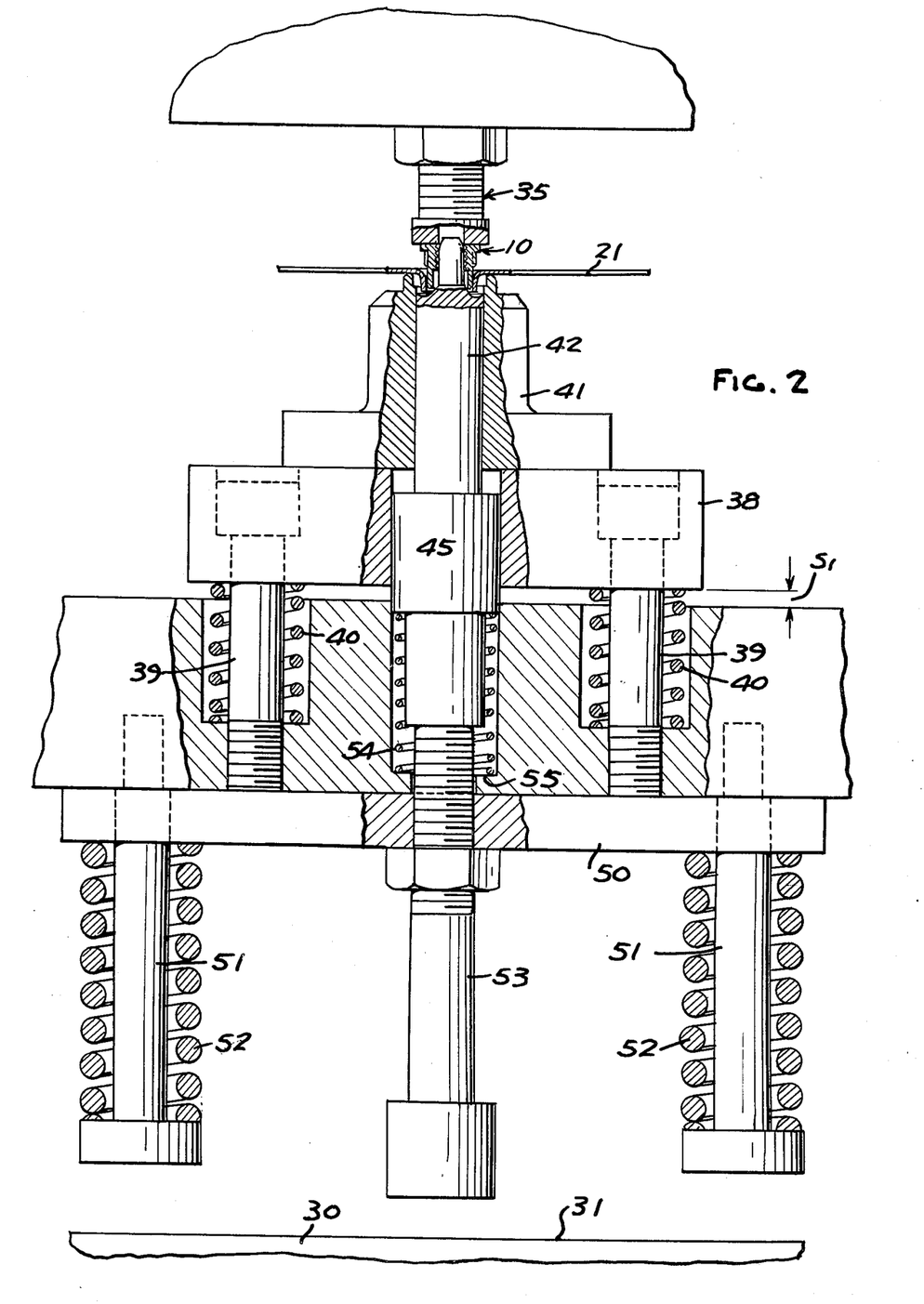
FIG. 2 is a view similar to FIG. 1 showing the parts in a different operative position.

Initially, as shown in FIGS. 2 and 13, the lower end of the nut 10 engages the portion of the sheet surrounding the pin 46 and interposed between the opening and the upper end of the die element 41 to deform the sheet and define a tubular portion which has its periphery spaced from the wall of the opening 42.

Continued movement of the platen 34 initially brings the die element 44 into engagement with the force transmitting member 53 thereby taking up the space S2, as shown in FIG. 2.

Figure 3:
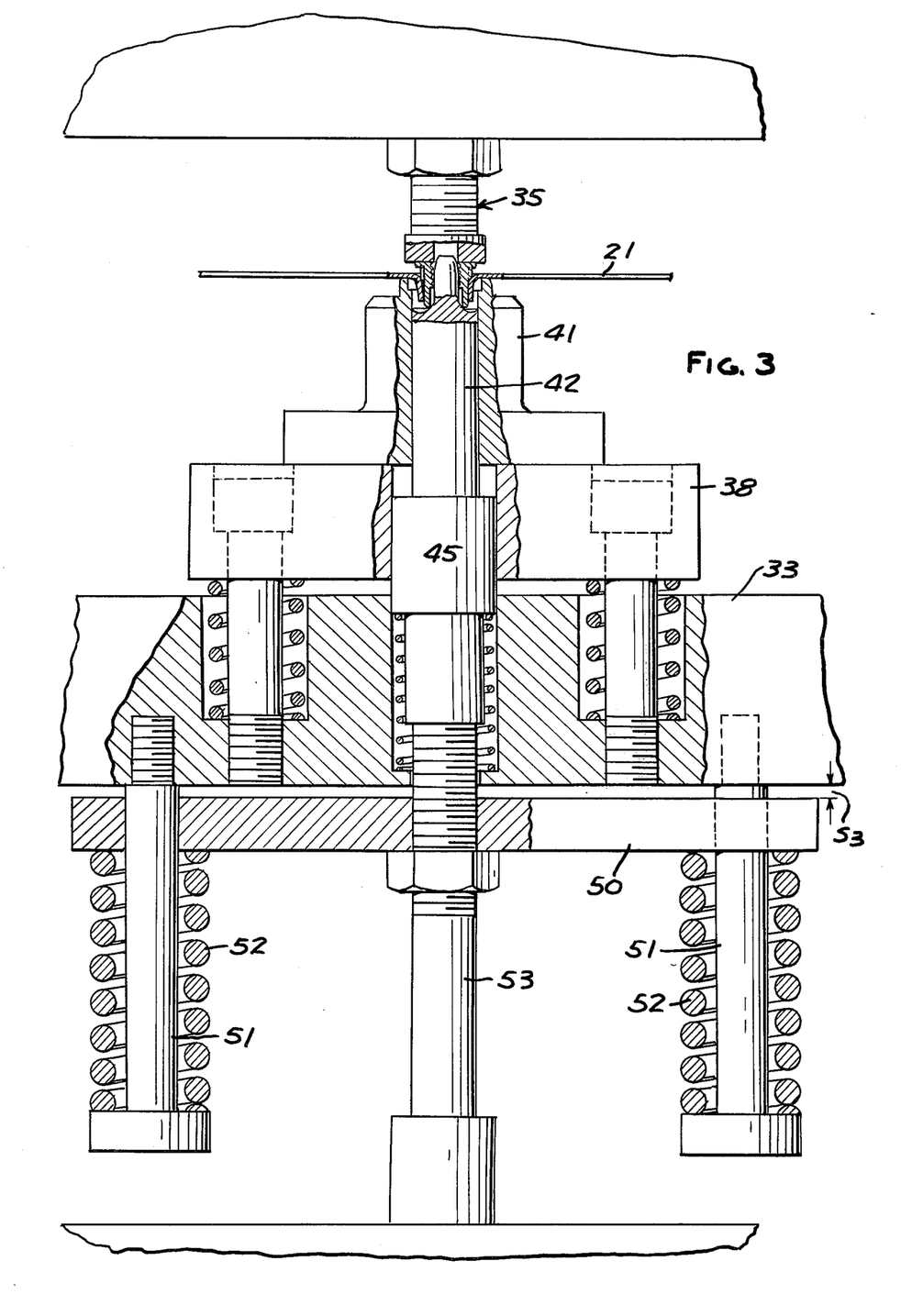
FIG. 3 is a view similar to FIG. 2 showing the parts in a further operative position.
Figure 14:
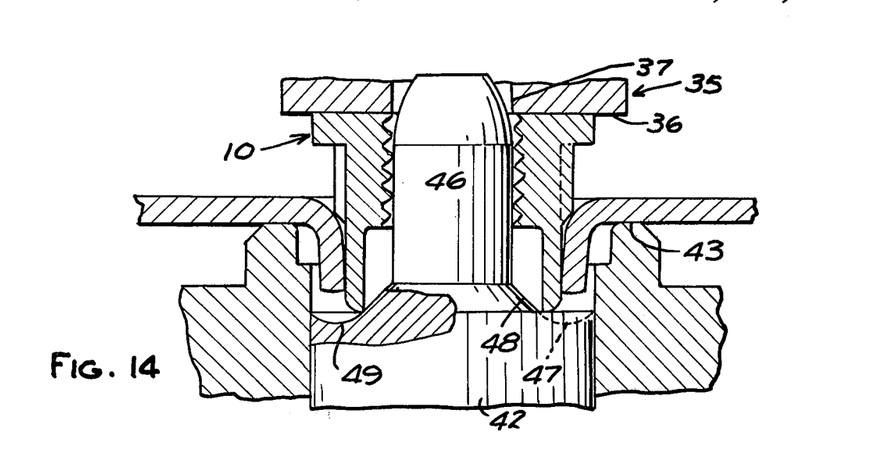
FIG. 14 is an enlarged sectional view of a portion of the apparatus shown in FIG. 3.

Continued movement of the platen 34 completes the formation of the tubular portion and brings the lower end of the nut into engagement with the annular recess 47 (FIG. 14) and brings the lower end of the force transmitting member 53 into engagement with the surface 31 of the base 30 as shown in FIG. 3. This carries the lower or second plate 50 away from the platen 33 to define a space S3 against the action of the spring 52.

Figure 4:
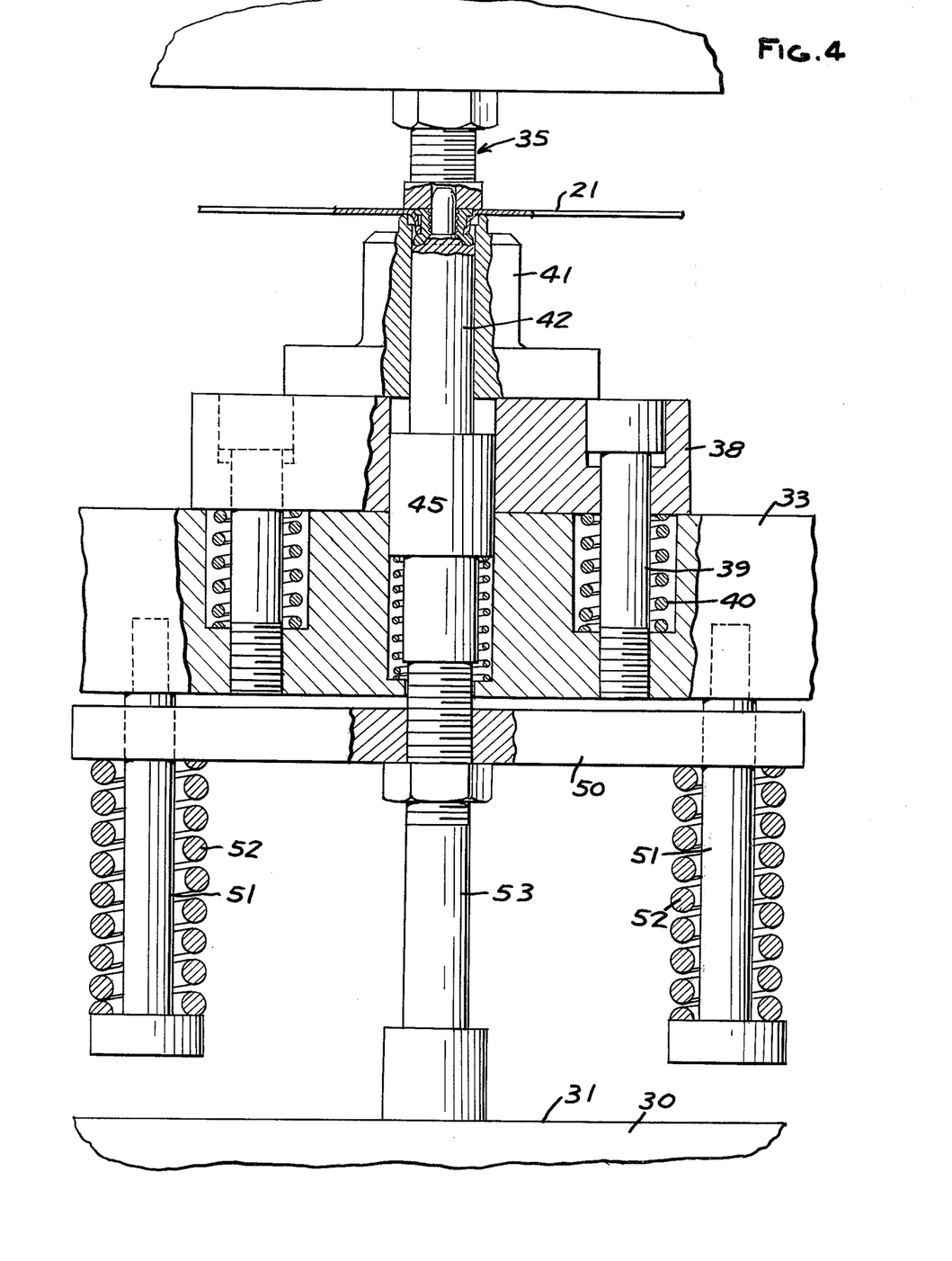
FIG. 4 is a view similar to FIG. 3 showing the parts in a further operative position.
Figure 5:
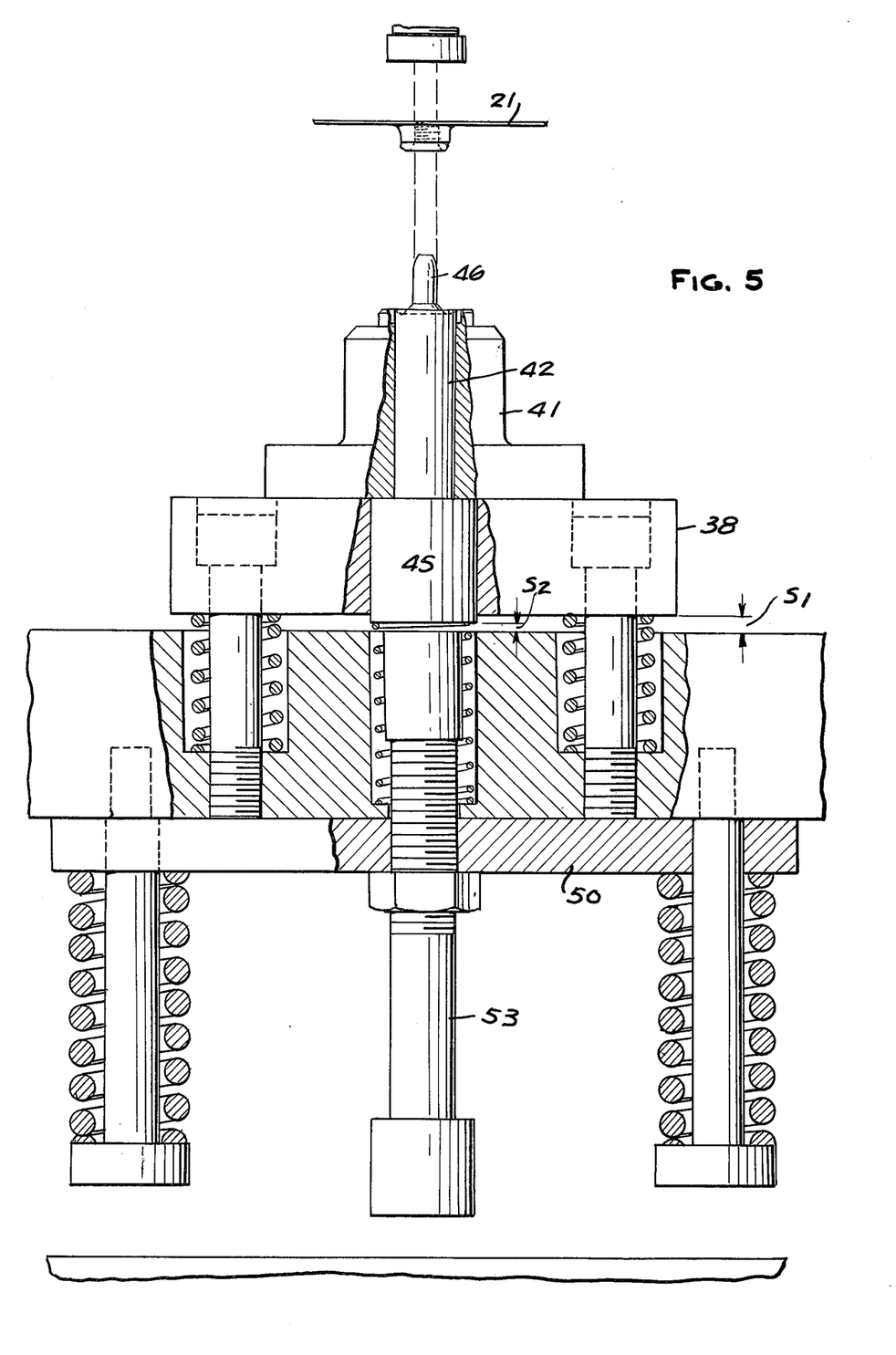
FIG. 5 is a view similar to FIG. 4 showing the parts in a further operative position.
Figure 15:
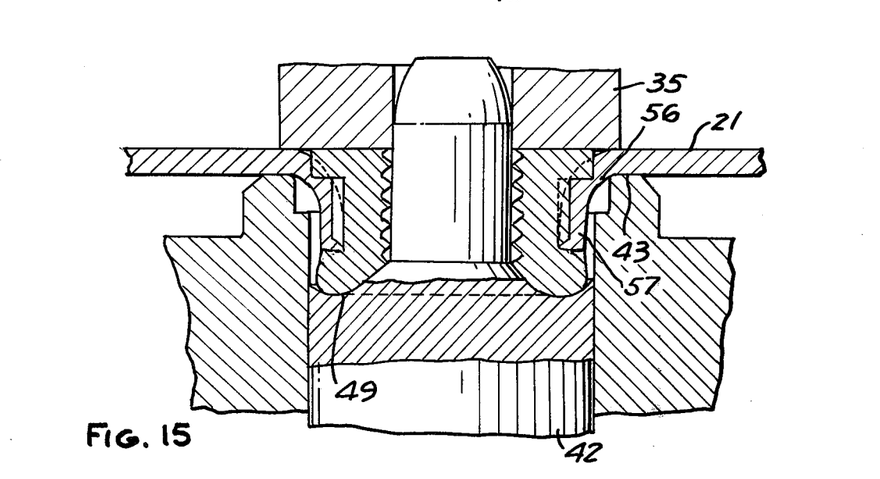
FIG. 15 is an enlarged sectional view of a portion of the apparatus shown in FIG. 4.
Figure 16:
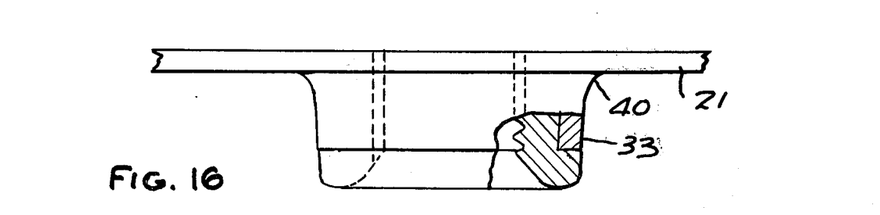
FIG. 16 is an elevational view of a joint embodying the invention.

Continued movement of the platen 34 causes the nut to move axially and deforms the lower end of the nut against the lower end of the tubular portion while bringing the upper end of the nut into flush relationship with the top surface of the plate. As shown in FIGS. 4 and 15, in the final movement of the platen, the surface 36 of the force applying tool 35 engages the upper surface of the plate, clamping the plate between the surface 36 and the surface 43, as well as applying a force to the upper end of the nut.

Finally when the platen 34 is retracted, the force of springs 52 pushes tool 42 upwardly to eject the nut and plate.

The resultant joint comprises the flat portion of plate 21 and an integral tubular portion 33 connected to the flat portion of the plate by an intermediate annular section 55 of substantially constant curvature and uniform cross section spaced from the periphery of the flange 12 except at the corners 20. The lower edges of the corners 20 are impressed and cut into or deform parts of an upper portion 56 and serrations 16 are impressed and cut into or deform spaced parts of an intermediate portion 57.

The resultant joint provides a strong high torque connection between the nut and the plate. As shown in FIG. 8, the corners 20 only slightly indent the metal plate and as shown in FIGS. 6 and 7, the serrations indent the metal plates only sufficiently to provide adequate torque.

It has been found that a construction such as that shown and described provides a strength which has not heretofore been possible. Thus in a 90° force test wherein a force is applied axially upwardly as shown in FIG. 6, the following test results were noted:

Compressive Load applied to 5/16 inch Allen Screw through joint nut at 45° from end adjacent tubular portion 33 — bending without failure at 1200 pounds. Compressive Load applied axially to 5/16 inch Allen Screw from end adjacent end of tubular portion 33 — deflection of 0/16 inches at load of 4500 pounds. Compressive Load applied to 5/16 inch Allen Screw from end opposite tubular portion 33 —500 pounds with no movement detected. Repeated torquing of 35 foot pounds on nut of 5/16 inch Allen Screw without movement.

In the modified form of the invention shown in FIG. 9, the flange 12' is cylindrical rather than hexagonal. In this form, there are no corners on the flange so that the entire periphery is spaced from the upper surface of the plate and the lower edge does not indent the plate as in the other form of nut.

I claim:

1. The method of forming a nut joint which comprises positioning a sheet metal plate having an opening therein over a locating pin, positioning a nut over said pin, said nut comprising a tubular body with a peripheral flange at one end and an opening extending through said body, said opening having a first portion which is threaded and a second portion of greater diameter defining a riveting flange at the other end of said body, said body having a plurality of circumferentially spaced serrations extending axially from said flange on the periphery thereof adjacent said flange, said riveting flange engaging said plate when said nut is positioned on said pin, applying an axial force to said nut to cause only said body of said nut to bend the area of the plate surrounding the opening in the plate and thereby define a tubular portion on the plate without substantially changing the cross sectional thickness of the plate, continuing the application of force until the serrations become embedded in the tubular portion and the end of the nut having the flange thereon is substantially flush with the remainder of the plate, and thereafter applying an oppositely directed axial force to the riveting flange portion of said nut to deform said portion radially outwardly into engagement with the end of the tubular portion that has been formed in the plate.

2. The method set forth in claim 1 including controlling the bending of the plate and the movement of said nut such that the plate and tubular portion are connected by an intermediate uniformly curved section joining the plate and tubular portion comprising a first annular portion surrounding and spaced from the periphery of the nut, a second annular portion surrounding the lower edges of the flange of the nut into which said edges are impressed, and a third annular portion surrounding the serrations into which the serrations are impressed.

3. The method of forming a nut joint which comprises supporting a sheet metal plate having an opening therein on one surface thereof about an annular portion surrounding the opening, while leaving the portion between the annular portion and the opening unsupported, said opening being positioned over a locating pin, positioning a nut over said pin on the opposite surface adjacent said opening, said nut comprising a tubular body with a peripheral flange at one end and an opening extending through said body, said opening having a first portion which is threaded and a second portion of greater diameter defining a riveting flange at the other end of said body, said body having a plurality of circumferentially spaced serrations extending axially from said flange on the periphery thereof adjacent said flange, the outer diameter of said tubular body being spaced radially inwardly from said supporting area of said plate, said riveting flange engaging said plate when said nut is positioned on said pin, applying an axial force to said nut to cause only said body of said nut to bend the area of the plate surrounding the opening in the plate and thereby define a tubular portion on the plate without substantially changing the cross sectional thickness of the plate, continuing the application of force until the serrations become embedded in the tubular portion and the end of the nut having the flange thereon is substantially flush with the remainder of the plate, and thereafter applying an oppositely directed axial force to the riveting flange portion of said nut to deform said portion radially outwardly into engagement with the end of the tubular portion that has been formed in the plate.

4. The method set forth in claim 3 including the step of leaving the portion of the tubular portion intermediate the end and the remainder of the plate unconfined during the application of the axial force.

5. The method of forming a nut joint which comprises supporting a sheet metal plate having an opening therein on one surface thereof about an annular portion surrounding the opening, while leaving the portion between the annular portion and the opening unsupported, said opening being positioned over a locating pin, positioning a nut over said pin on the opposite surface adjacent said opening, said nut comprising a tubular body with a peripheral flange at one end and an opening extending through said body, said opening having a first portion which is threaded and a second portion of greater diameter defining a riveting flange at the other end of said body, said body having a plurality of circumferentially spaced serrations extending axially from said flange on the periphery thereof adjacent said flange, the outer diameter of said tubular body being spaced radially inwardly from said supporting area of said plate, said riveting flange engaging said plate when said nut is positioned on said pin, applying a continuous axial force to said nut to cause only said body of said nut to bend the area of the plate surrounding the opening in the plate and thereby define a tubular portion on the plate without substantially changing the cross sectional thickness of the plate, continuing the application of force until the serrations become embedded in the tubular portion and the end of the nut having the flange thereon is substantially flush with the remainder of the plate, and thereafter applying an oppositely directed axial force and guiding said riveting flange portion of said nut radially outwardly to deform said portion radially outwardly into engagement with the end of the tubular portion that has been formed in the plate.

6. The method of forming a nut joint which comprises positioning a sheet metal plate having an opening therein over a locating pin, positioning a nut over said pin, said nut comprising a tubular body with a peripheral flange at one end and an opening extending through said body, said opening having a first portion which is threaded and a second portion of greater diameter defining a riveting flange at the other end of said body, said riveting flange engaging said plate when said nut is positioned on said pin, applying an axial force to said nut to cause only said body of said nut to bend the area of the plate surrounding the opening in the plate and thereby define a tubular portion on the plate without substantially changing the cross sectional thickness of the plate, continuing the application of force until the end of the nut having the flange thereon is substantially flush with the remainder of the plate, and thereafter applying an oppositely directed axial force to the riveting flange portion of said nut to deform said portion radially outwardly into engagement with the end of the tubular portion that has been formed in the plate.

7. The method of forming a nut joint which comprises supporting a sheet metal plate having an opening therein on one surface thereof about an annular portion surrounding the opening, while leaving the portion between the annular portion and the opening unsupported, said opening being positioned over a locating pin, positioning a nut over said pin on the opposite surface adjacent said opening, said nut comprising a tubular body with a peripheral flange at one end and an opening extending through said body, said opening having a first portion which is threaded and a second portion of greater diameter defining a riveting flange at the other end of said body, the outer diameter of said tubular body being spaced radially inwardly from said supporting area of said plate, said riveting flange engaging said plate when said nut is positioned on said pin, applying an axial force to said nut to cause only said body of said nut to bend the area of the plate surrounding the opening in the plate and thereby define a tubular portion on the plate without substantially changing the cross sectional thickness of the plate, continuing the application of force until the serrations become embedded in the tubular portion and the end of the nut having the flange thereon is substantially flush with the remainder of the plate, and thereafter applying an oppositely directed axial force to the riveting flange portion of said nut to deform said portion radially outwardly into engagement with the end of the tubular portion that has been formed in the plate.

8. The method of forming a nut joint which comprises supporting a sheet metal plate having an opening therein on one surface thereof about an annular portion surrounding the opening, while leaving the portion between the annular portion and the opening unsupported, said opening being positioned over a locating pin, positioning a nut over said pin on the opposite surface adjacent said opening, said nut comprising a tubular body with a peripheral flange at one end and an opening extending through said body, said opening having a first portion which is threaded and a second portion of greater diameter defining a riveting flange at the other end of said body, the outer diameter of said tubular body being spaced radially inwardly from said supporting area of said plate, said riveting flange engaging said plate when said nut is positioned on said pin, applying a continuous axial force to said nut to cause only said body of said nut to bend the area of the plate surrounding the opening in the plate and thereby define a tubular portion on the plate without substantially changing the cross sectional thickness of the plate, continuing the application of force until the end of the nut having the flange thereon is substantially flush with the remainder of the plate, and thereafter applying an oppositely directed axial force and guiding said riveting flange portion of said nut radially outwardly to deform said portion radially outwardly into engagement with the end of the tubular portion that has been formed in the plate.

* * * * *